(12) United States Patent
Magruder et al.

(10) Patent No.: US 7,899,999 B2
(45) Date of Patent: Mar. 1, 2011

(54) HANDLING FALSELY DOOMED PARENTS OF NESTED TRANSACTIONS

(75) Inventors: Michael M. Magruder, Carnation, WA (US); David Detlefs, Issaquah, WA (US); John Joseph Duffy, Seattle, WA (US); Goetz Graefe, Madison, WI (US); Vinod K. Grover, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 11/823,162

(22) Filed: Jun. 27, 2007

(65) Prior Publication Data

US 2009/0006404 A1 Jan. 1, 2009

(51) Int. Cl.
*G06F 12/00* (2006.01)
(52) U.S. Cl. ........... 711/154; 711/150; 711/E12.044
(58) Field of Classification Search .......... None
See application file for complete search history.

(56) References Cited

U.S. PATENT DOCUMENTS

| | | | |
|---|---|---|---|
| 5,241,675 A | 8/1993 | Sheth et al. | |
| 5,335,343 A | 8/1994 | Lampson et al. | |
| 5,701,480 A | 12/1997 | Raz | |
| 6,298,478 B1 | 10/2001 | Nally et al. | |
| 6,671,686 B2 | 12/2003 | Pardon et al. | |
| 6,754,737 B2 | 6/2004 | Heynemann et al. | |
| 6,785,779 B2 | 8/2004 | Berg et al. | |
| 7,089,253 B2 | 8/2006 | Hinshaw et al. | |
| 2003/0115276 A1 | 6/2003 | Flaherty et al. | |
| 2004/0015642 A1 | 1/2004 | Moir et al. | |
| 2005/0138375 A1* | 6/2005 | Sadjadi | 713/167 |
| 2006/0112248 A1 | 5/2006 | Meiri et al. | |
| 2006/0190504 A1 | 8/2006 | Pruet, III | |
| 2006/0218206 A1 | 9/2006 | Bourbonnais et al. | |
| 2007/0186056 A1* | 8/2007 | Saha et al. | 711/144 |
| 2007/0239915 A1* | 10/2007 | Saha et al. | 710/200 |
| 2008/0034172 A1 | 2/2008 | Duffy et al. | |

OTHER PUBLICATIONS

International Search Report and Written Opinion Received for PCT Application No. PCT/US2008/067145, mailed on Dec. 29, 2008, 10 pages.
Costich, Oliver, "Transaction Processing Using an Untrusted Scheduler in a Multilevel Database with Replicated Architectures," IFIP Transactions; Results of the IFIP WG 11.3 Workshops on Database Security V: Status and Prospects, vol. A-6, pp. 173-189 Nov. 1991.
Dekeyser, Stijn, et al., "Conflict Scheduling of Transactions on XML Documents," ACM International Conference Proceedings Series, vol. 52, Proceedings of the 15th Australian Database Conference, vol. 27, pp. 93-101 Jan. 2004.
Yeo, L. H., et al., "Linear Orderability of Transactions in Mobile Environment with Heterogeneous Database," http://journalogy.com, pp. 1 Abstract Jun. 1996.

* cited by examiner

*Primary Examiner* — Reginald G Bragdon
*Assistant Examiner* — Aracelis Ruiz

(57) ABSTRACT

Various technologies and techniques are disclosed for detecting falsely doomed parent transactions of nested children in transactional memory systems. When rolling back nested transactions, a release count is tracked each time that a write lock is released due to rollback for a given nested transaction. For example, a write abort compensation map can be used to track the release count for each nested transaction. The number of times the nested transactions releases a write lock is recorded in their respective write abort compensation map. The release counts can be used during a validation of a parent transaction to determine if a failed optimistic read is really valid. If an aggregated release count for the nested children transactions accounts for the difference in version numbers exactly, then the optimistic read is valid.

18 Claims, 6 Drawing Sheets

HANDLING FALSELY DOOMED PARENTS OF NESTED TRANSACTIONS

BACKGROUND

Software transactional memory (STM) is a concurrency control mechanism analogous to database transactions for controlling access to shared memory in concurrent computing. A transaction in the context of transactional memory is a piece of code that executes a series of reads and writes to shared memory. STM is used as an alternative to traditional locking mechanisms. STM allows concurrent programs to be written more simply. A transaction specifies a sequence of code that is supposed to execute as if it were executing in isolation. This illusion of isolation is achieved by fine-grained locking of objects, and by executing in a mode that allows the side-effects of the transaction to be rolled back if the transaction is discovered to be in conflict with some other transaction. We say that a data access is "transacted" if the code generated for that access has been modified to include support for these locking and rollback mechanisms.

Many STM systems support nested transactions, allowing efficient composition of different components authored using transactions. A nested transaction is considered closed if it its effects are part of the same isolation boundary as its containing, or parent, transaction. When a closed nested transaction commits, its effects do not become visible to the rest of the system. Instead, its effects become part of the parent transaction, still in progress, and will become visible to the rest of the system only when the parent transaction finally commits. When a nested transaction rolls back, its temporary effects are undone and the state of the parent transaction is restored to the point that the nested transaction began.

STM systems that use in-place writes and optimistic reads use a version number associated with each lockable region of memory to indicate when changes are made to shared data. A reading transaction will optimistically record the version number of the memory (object, cache line, etc.) but not otherwise lock the data. The transaction may commit if the version number does not change over the life of the transaction. Writing transactions increment the version number when releasing their write locks, either for commit or rollback. The version number must be increased during rollback because the writing transaction temporarily updated data in-place. These updates are visible to the reading transaction, and it must be notified that it cannot commit, having potentially read inconsistent data.

Nested transactions that write data not yet written by the parent must increment version numbers on rollback just like non-nested (top-level) transactions. However, consider the case where a parent transaction optimistically reads a variable X and a nested child transaction writes to variable X for the first time. The parent will record the version number of X in its log, say, version V1. The nested transaction will begin and acquire a write lock on X. If the nested transaction commits, then there are no problems: the write lock is not released and is transferred to the parent and the parent remains consistent, able to commit. However, if the nested transaction rolls back, for whatever reason, it must release the write lock and increment the version number for X to V2. The parent will appear to be inconsistent at commit time. The version of X is V2, but the parent read it at V1 and has no record of who changed the version number to V2. It appears that the parent has conflicted with another transaction, but in fact it was a nested child transaction that caused the version number increase, and this is not actually a conflict. The parent has been doomed by its child's rollback operation. This problem causes STM systems to experience spurious re-executions of parent transactions.

SUMMARY

Various technologies and techniques are disclosed for detecting falsely doomed parent transactions of nested children in transactional memory systems. When rolling back nested transactions, a release count is tracked each time that a write lock is released for a given nested transaction. For example, a write abort compensation map can be used to track the release count for each lock released for each nested transaction that rolls back. The number of times the nested transactions release a write lock is recorded in their respective write abort compensation map. The release counts can be used during a validation of a parent transaction to determine if an apparently invalid optimistic read is really valid.

In one implementation, while processing a parent transaction log, any write abort compensation maps seen for nested child transactions are aggregated into an aggregated write abort compensation map in the parent. If the optimistic read failed to validate due to a version number mismatch, then the aggregated write abort compensation map is consulted to retrieve a particular variable's write lock release count for the nested child transactions. If a difference in version numbers exactly matches the write lock release count for the nested child transactions, then the optimistic read is valid.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
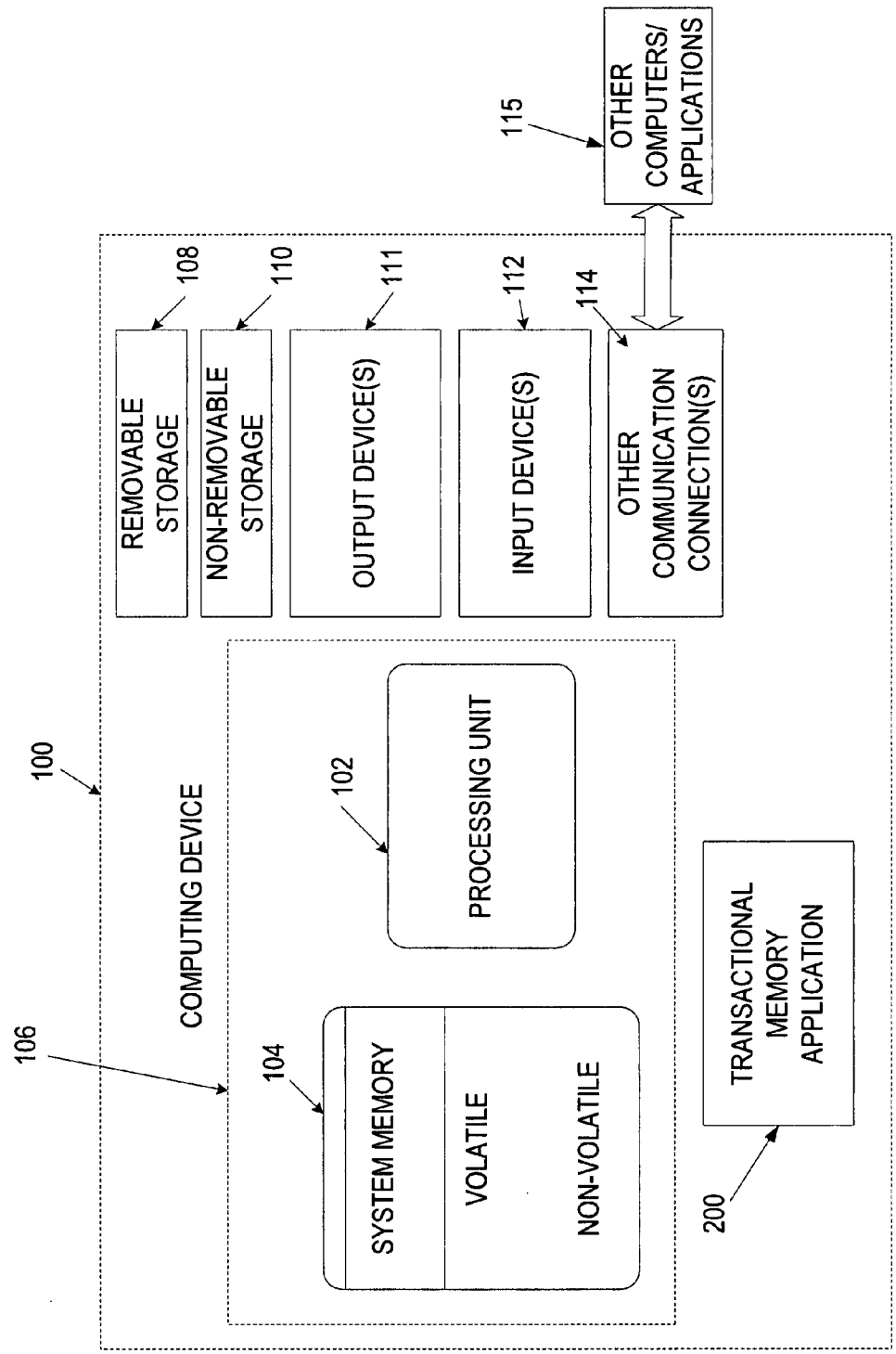
FIG. 1 is a diagrammatic view of a computer system of one implementation.

The technologies and techniques herein may be described in the general context as a transactional memory system, but the system also serves other purposes in addition to these. In one implementation, one or more of the techniques described herein can be implemented as features within a framework program such as MICROSOFT® .NET Framework, or from any other type of program or service that provides platforms for developers to develop software applications. In another implementation, one or more of the techniques described herein are implemented as features with other applications that deal with developing applications that execute in concurrent environments.

In one implementation, a transactional memory system is provided that allows the false dooming of parent transactions of nested child transactions to be detected and avoided. The term "doomed" as used herein is meant to include transactions that will later be rolled back because they have performed one or more optimistic reads on one or more variables that have subsequently been written by other transactions. When attempting to commit such a transaction, the failed optimistic reads will cause the transaction to roll back and re-execute. The term "falsely doomed" as used herein is meant to include any transaction that appears to be doomed due to a failed optimistic read, but that is actually not doomed because the optimistic read was actually valid due to operations performed by nested transactions. The term "nested transaction" as used herein is meant to include any transaction whose effects are enclosed within the isolation boundary of another transaction. The transaction that encloses the nested transaction is called the "parent" of the nested transaction, and the nested transaction is typically called the "child". The number of times each nested child releases a write lock is tracked in per-lock release counts. In one implementation, these counts are tracked in a write abort compensation map. The term "write abort compensation map" as used herein is meant to include a data structure that stores the per-lock release counts for each lock that each nested child releases. Multiple write abort compensation maps can be aggregated into an aggregate map during transaction validation or roll back.

When validating a parent transaction, if an optimistic read fails validation, then the current aggregate write abort compensation map is consulted to see if the difference in version numbers in a transactional memory word exactly matches the aggregate release count of the nested child transactions for that object or memory region. If so, then the optimistic read is actually valid and the parent should not be falsely doomed. The term transactional memory word as used herein is meant to include a data structure provided for each transaction that tracks various information about the given transaction, such as lock status and version number. For example, the TMW can include a version number and a list/count and/or indicator of readers. In one implementation, the list/count and/or indicator of readers can include a count of the number of readers accessing the particular value at a given point in time. In another implementation, the list/count and/or indicator of readers can include a list of the particular readers (e.g. pessimistic) accessing the particular value at a given point in time. In yet another implementation, the list/count and/or indicator of readers is simply a flag or other indicator to indicate that there are one or more readers accessing the particular value at a given point in time. These are just examples, and the use of the term TMW herein is meant to cover a variety of mechanisms for tracking transaction statuses.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional memory application 200. Transactional memory application 200 will be described in further detail in FIG. 2.

Figure 2:
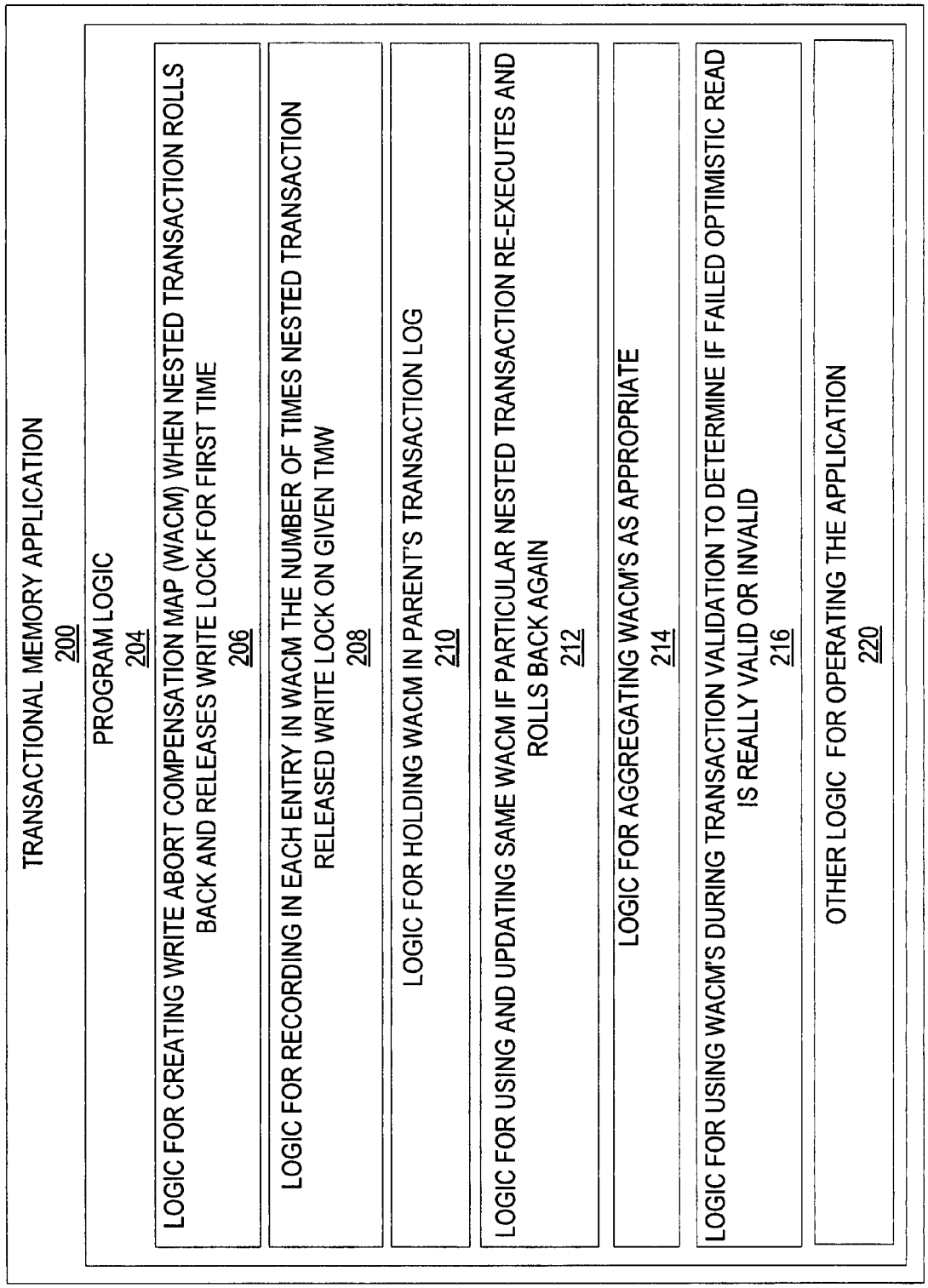
FIG. 2 is a diagrammatic view of a transactional memory application of one implementation operating on the computer system of FIG. 1.

Turning now to FIG. 2 with continued reference to FIG. 1, a transactional memory application 200 operating on computing device 100 is illustrated. Transactional memory application 200 is one of the application programs that reside on computing device 100. However, it will be understood that transactional memory application 200 can alternatively or additionally be embodied as computer-executable instructions on one or more computers and/or in different variations than shown on FIG. 1. Alternatively or additionally, one or more parts of transactional memory application 200 can be part of system memory 104, on other computers and/or applications 115, or other such variations as would occur to one in the computer software art.

Transactional memory application 200 includes program logic 204, which is responsible for carrying out some or all of the techniques described herein. Program logic 204 includes logic for creating a write abort compensation map (WACM) when a nested transaction rolls back and releases a write lock for the first time 206 (as described below with respect to FIG. 4); logic for recording in each entry in the WACM, the number of times a nested transaction released the write lock in a given transactional memory word 208 (as described below with respect to FIG. 4); logic for holding WACM in parent's transaction log 210 (as described below with respect to FIG. 4); logic for using and updating same WACM if a particular nested transaction re-executes and rolls back again 212 (as described below with respect to FIG. 4); logic for aggregating WACM'S as appropriate 214 (as described below with respect to FIG. 5); logic for using WACM's during transaction validation to determine if failed optimistic read is really valid or invalid 216 (as described below with respect to FIG. 6); and other logic for operating the application 220.

Figure 3:
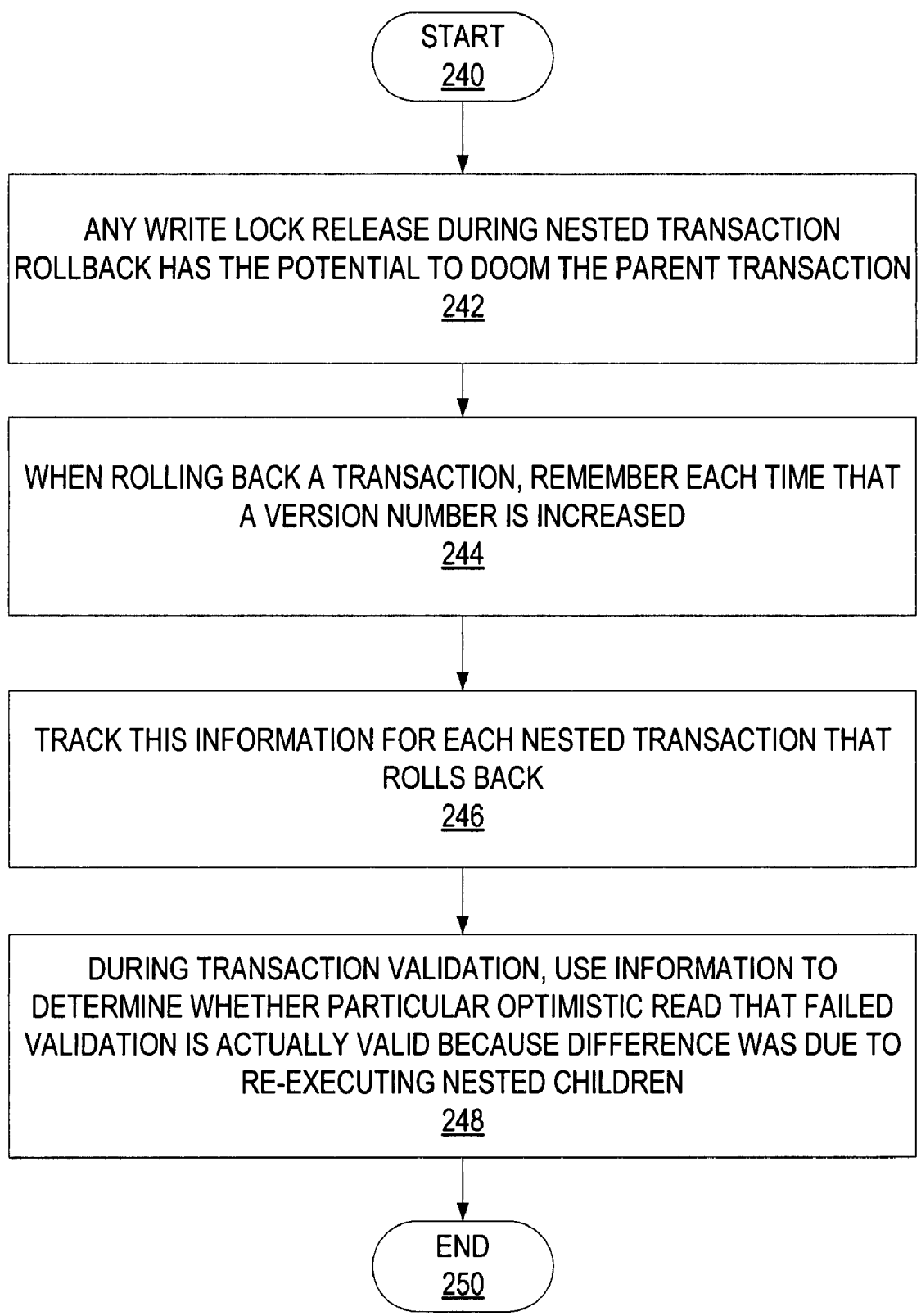
FIG. 3 is a high-level process flow diagram for one implementation of the system of FIG. 1.

Turning now to FIGS. 3-6 with continued reference to FIGS. 1-2, the stages for implementing one or more implementations of transactional memory application 200 are described in further detail. In some implementations, the processes of FIGS. 3-6 are at least partially implemented in the operating logic of computing device 100. FIG. 3 is a high level process flow diagram for transactional memory application 200. The process begins at start point 240. Any write lock released during nested transaction rollback has the potential to doom the parent transduction (stage 242). When rolling back a transaction, each time that a version number is increased is remembered (stage 244). The system tracks this information for each nested transaction that rolls back (stage 246). During transaction validation, the system uses this information to determine whether a particular optimistic read that failed validation is actually valid because the difference was due to re-execution nested children (stage 248). These stages are described in further detail in FIGS. 4-6. The process ends at end point 250.

Figure 4:
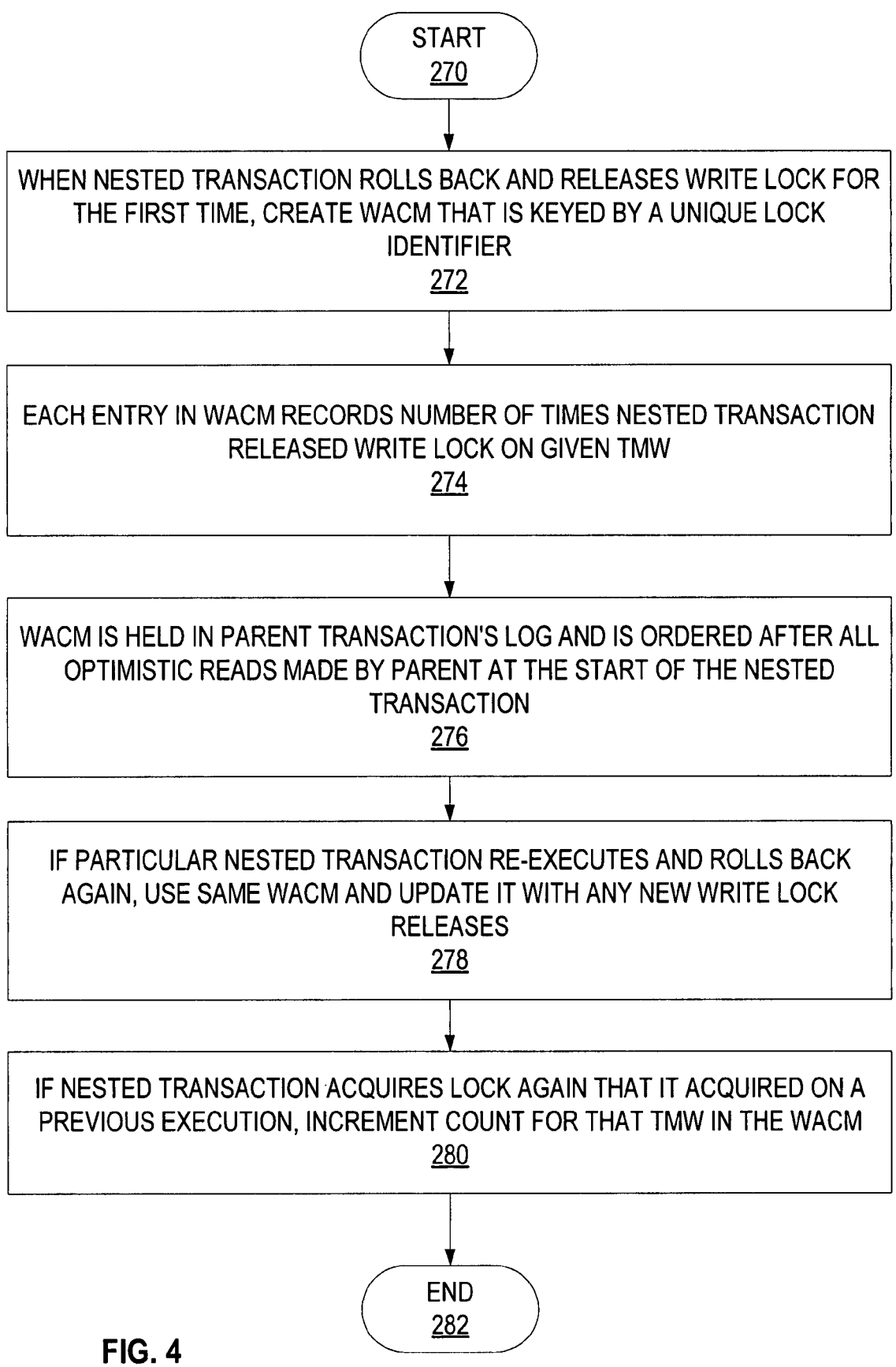
FIG. 4 is a process flow diagram for one implementation of the system of FIG. 1 illustrating the stages involved in creating and maintaining write abort compensation maps.

FIG. 4 illustrates one implementation of the stages involved in creating and maintaining write abort compensation maps. The process begins at start point 270 with creating a write abort compensation map (WACM) that is keyed by a unique lock identifier when a nested transaction rolls back and releases a write lock for the first time (stage 272). Each entry in the WACM records the number of times the nested transaction released a write lock on a given transactional memory word (stage 274).

The WACM is held in a parent transaction's log and is ordered after all optimistic reads made by the parent at the start of the nested transaction (stage 276). If a particular nested transaction re-executes and rolls back again, the system uses the same WACM and updates it with any new write lock release (stage 278). If the nested transaction acquires a lock again that it acquired on a previous execution, the count for that transactional memory word is incremented in the WACM (stage 280). The process ends at end point 282.

Figure 5:
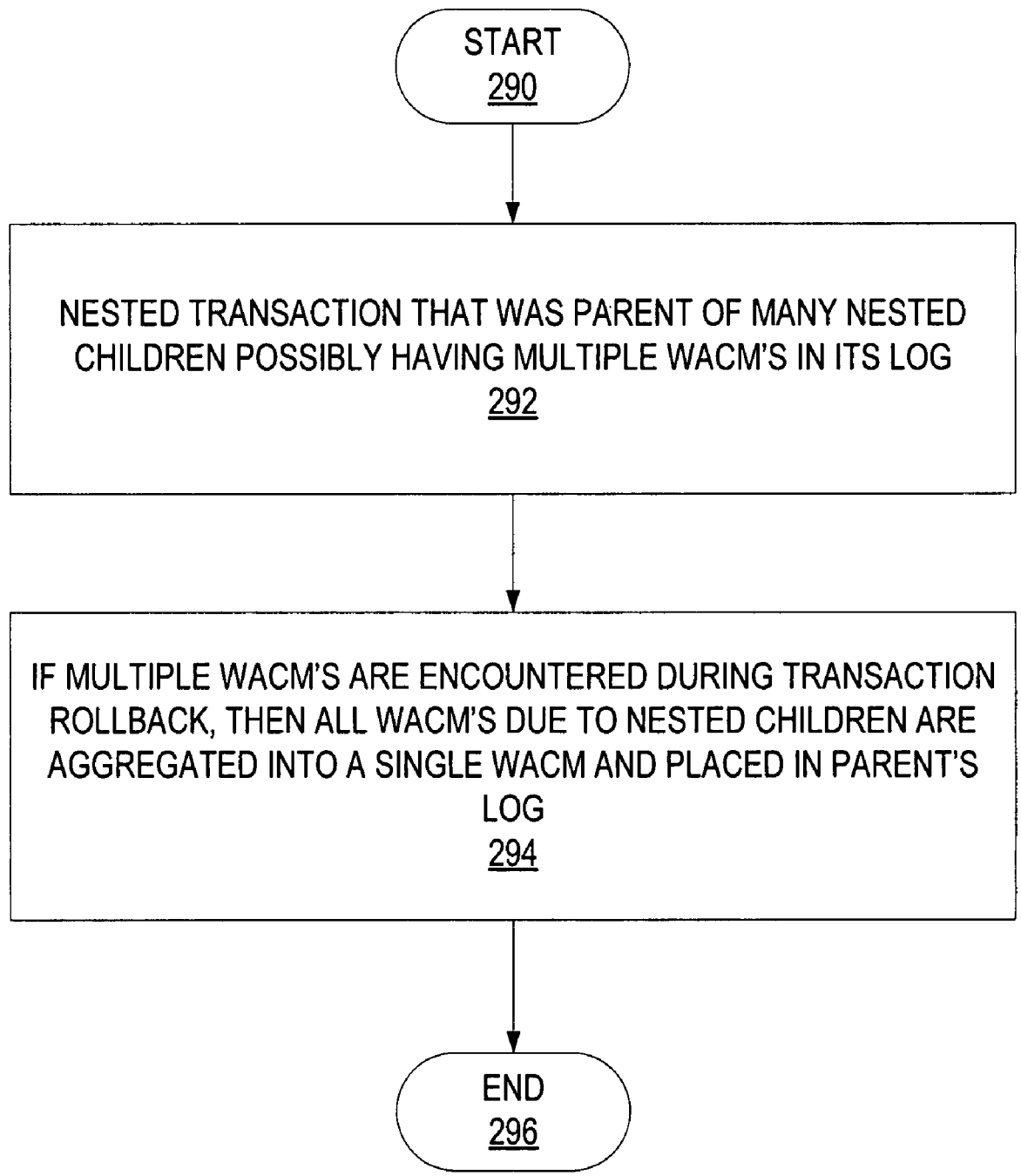
FIG. 5 is a process flow diagram for one implementation of the system of FIG. 1 illustrating the stages involved in aggregating write abort compensation maps during transaction rollback.

FIG. 5 illustrates one implementation of the stages involved in aggregating WACM'S during transaction rollback. The process begins at start point 290 with a nested transaction that was also the parent of many nested children over time possibly having multiple WACM's dispersed throughout its log (stage 292). If multiple WACM'S are encountered during transaction rollback, then all WACM'S due to the nested children are aggregated into a single WACM and placed in the parent's log (stage 294). The process ends at end point 296.

Figure 6:
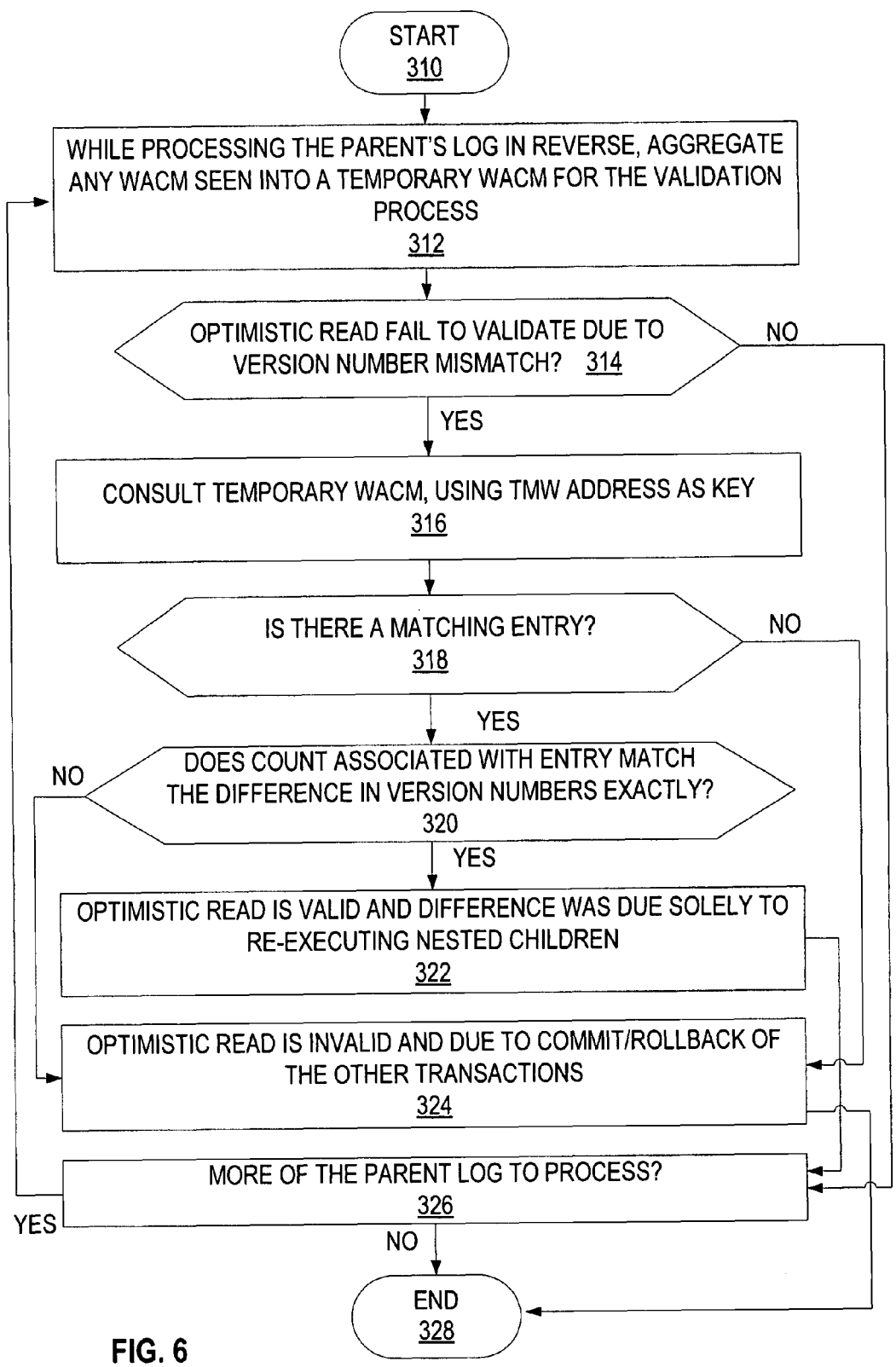
FIG. 6 is a process flow diagram for one implementation of the system of FIG. 1 illustrating the stages involved in using write abort compensation maps during transaction validation to avoid falsely dooming parents of nested transactions.

FIG. 6 illustrates one implementation of the stages involved in using WACM'S during transaction validation to avoid falsely dooming parents of nested transactions. The process begins at start point 310 with aggregating any WACM seen as optimistic read entries are processed into a temporary WACM for the validation process while processing the parent's log in reverse (stage 312). If the optimistic read failed to validate due to a version number mismatch (decision point 314), then the temporary WACM is consulted, using the TWM address as a key (stage 316). If there is a matching entry on that TMW address (decision point 318), then the system calculates whether the count associated with the entry matches the difference in the version number exactly (decision point 320). If the count matches the difference in the version number exactly (decision point 320), then the optimistic read is valid and the difference was due solely to re-executing the nested children (stage 322). If not, then the optimistic read is invalid and is due to commit/rollback of the other transactions (stage 324). The stages are repeated for the entire parent log (decision point 326). The process ends at end point 328.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the examples discussed herein could be organized differently on one or more computers to include fewer or additional options or features than as portrayed in the examples.

What is claimed is:

1. A method for avoiding falsely doomed parent transactions of nested children in a transactional memory system comprising the steps of:
   when rolling back nested transactions, tracking a release count each time that a write lock is released; and
   during validation of a parent transaction, using the release count to determine whether an optimistic read that failed validation is actually valid.

2. The method of claim 1, wherein the failed validation is actually valid if a difference in version numbers exactly matches the release count.

3. The method of claim 1, wherein the release count is tracked in a write abort compensation map.

4. The method of claim 3, wherein the write abort compensation map is created for each of the nested transactions.

5. The method of claim 4, wherein the write abort compensation map is created for a respective one of the nested transactions when the respective one first rolls back and releases a write lock.

6. The method of claim 4, wherein the write abort compensation map for each of the nested transactions are aggregated into an aggregate write abort compensation map.

7. The method of claim 6, wherein the aggregate write abort compensation map is used while processing a transaction log of the parent transaction to determine if the optimistic read that failed is really valid.

8. The method of claim 7, wherein the transaction log of the parent is processed in a reverse order.

9. A computer storage medium having computer-executable instructions for causing a computer to perform steps comprising:
   creating a write abort compensation map for a nested transaction;
   recording in the write abort compensation map a number of times the nested transaction releases a write lock; and
   using the write abort compensation map during a validation of a parent transaction to determine if a failed optimistic read is really valid.

10. The computer storage medium of claim 9, wherein the write abort compensation map is created when the nested transaction rolls back and releases a write lock for a first time.

11. The computer storage medium of claim 9, wherein the failed optimistic read is really valid if a difference in version numbers exactly matches the number of times the nested transaction released the write lock.

12. The computer storage medium of claim 9, wherein the write abort compensation map is held in transaction log of the parent transaction.

13. The computer storage medium of claim 12, wherein the write abort compensation map is ordered after all optimistic reads made by the parent transaction at a start of the nested transaction.

14. The computer storage medium of claim 9, wherein the write abort compensation map is aggregated with other write abort compensation maps encountered for other nested children to form an aggregated write abort compensation map during parent transaction rollback.

15. The computer storage medium of claim 14, wherein the aggregated write abort compensation map is placed in a transaction log of the parent transaction.

16. The computer storage medium of claim 15, wherein the aggregated write abort compensation map is placed in the transaction log of the parent transaction when processing the transaction log of the parent in a reverse order.

17. A method for using write abort compensation maps during transaction validation to avoid falsely dooming parents of nested transactions comprising the steps of:

while processing a parent log, aggregating any write abort compensation maps seen in nested child transactions into an aggregated write abort compensation map;

if an optimistic read failed to validate due to a version number mismatch, then consulting the aggregated write abort compensation map to retrieve a write lock release count for the nested child transactions; and if a difference in version numbers exactly matches the write lock release count for the nested child transactions, then the optimistic read is valid.

18. The method of claim 17, wherein if the difference in version numbers does not exactly match the write release count for the nested child transactions, then the optimistic read is invalid.

* * * * *